United States Patent
Kamimura

(10) Patent No.: US 6,960,336 B2
(45) Date of Patent: Nov. 1, 2005

(54) METHOD OF PRODUCING LOW SODA ALUMINA, LOW SODA ALUMINA PRODUCED BY THE METHOD AND METHOD OF PRODUCING PORCELAIN

(75) Inventor: Katsuhiko Kamimura, Yokohama (JP)

(73) Assignee: Showa Denko K.K., Tokyo (JP)

( * ) Notice: Subject to any disclaimer, the term of this patent is extended or adjusted under 35 U.S.C. 154(b) by 400 days.

(21) Appl. No.: 10/149,579

(22) PCT Filed: Oct. 18, 2001

(86) PCT No.: PCT/JP01/09152

§ 371 (c)(1),
(2), (4) Date: Jun. 11, 2002

(87) PCT Pub. No.: WO02/34692

PCT Pub. Date: May 2, 2002

(65) Prior Publication Data

US 2004/0013603 A1 Jan. 22, 2004

Related U.S. Application Data

(60) Provisional application No. 60/301,240, filed on Jun. 28, 2001.

(30) Foreign Application Priority Data

Oct. 20, 2000 (JP) ........................................ 2000-321553

(51) Int. Cl.⁷ ................................................ C01F 7/00
(52) U.S. Cl. ..................................................... 423/625
(58) Field of Search ................................ 423/625, 626

(56) References Cited

U.S. PATENT DOCUMENTS

| | | | | | |
|---|---|---|---|---|---|
| 3,106,452 A | * | 10/1963 | Watson et al. | ............... | 423/111 |
| 3,175,883 A | * | 3/1965 | Lindsay et al. | ............. | 423/133 |
| 6,203,773 B1 | * | 3/2001 | Easley et al. | ............... | 423/626 |

FOREIGN PATENT DOCUMENTS

| | | | |
|---|---|---|---|
| EP | 281265 | * | 9/1988 |
| EP | 728700 | * | 8/1996 |
| JP | 06-329412 A | | 11/1994 |
| JP | 07-041318 A | | 2/1995 |
| JP | 10-167725 A | | 6/1998 |
| JP | 11-049515 A | | 2/1999 |

* cited by examiner

*Primary Examiner*—Steven Bos
(74) *Attorney, Agent, or Firm*—Sughrue Mion, PLLC

(57) ABSTRACT

A method of producing alumina having a low soda content and excellent sintering properties includes the steps of adding a soda removal agent to alumina source material and calcining the alumina source material in a calciner (2), using a dust collector (5) to collect calcined alumina source material dust contained in the exhaust gas, discharging a portion of the collected dust out of the system, slurrying another portion of the collected dust in a slurrifier (10) while controlling slurry pH, washing and filtering the slurried dust and recirculating it back to the calciner, recirculating still another portion of the collected dust together with a mineralizing agent to the calciner, and removing the low soda alumina after the calcination.

11 Claims, 1 Drawing Sheet

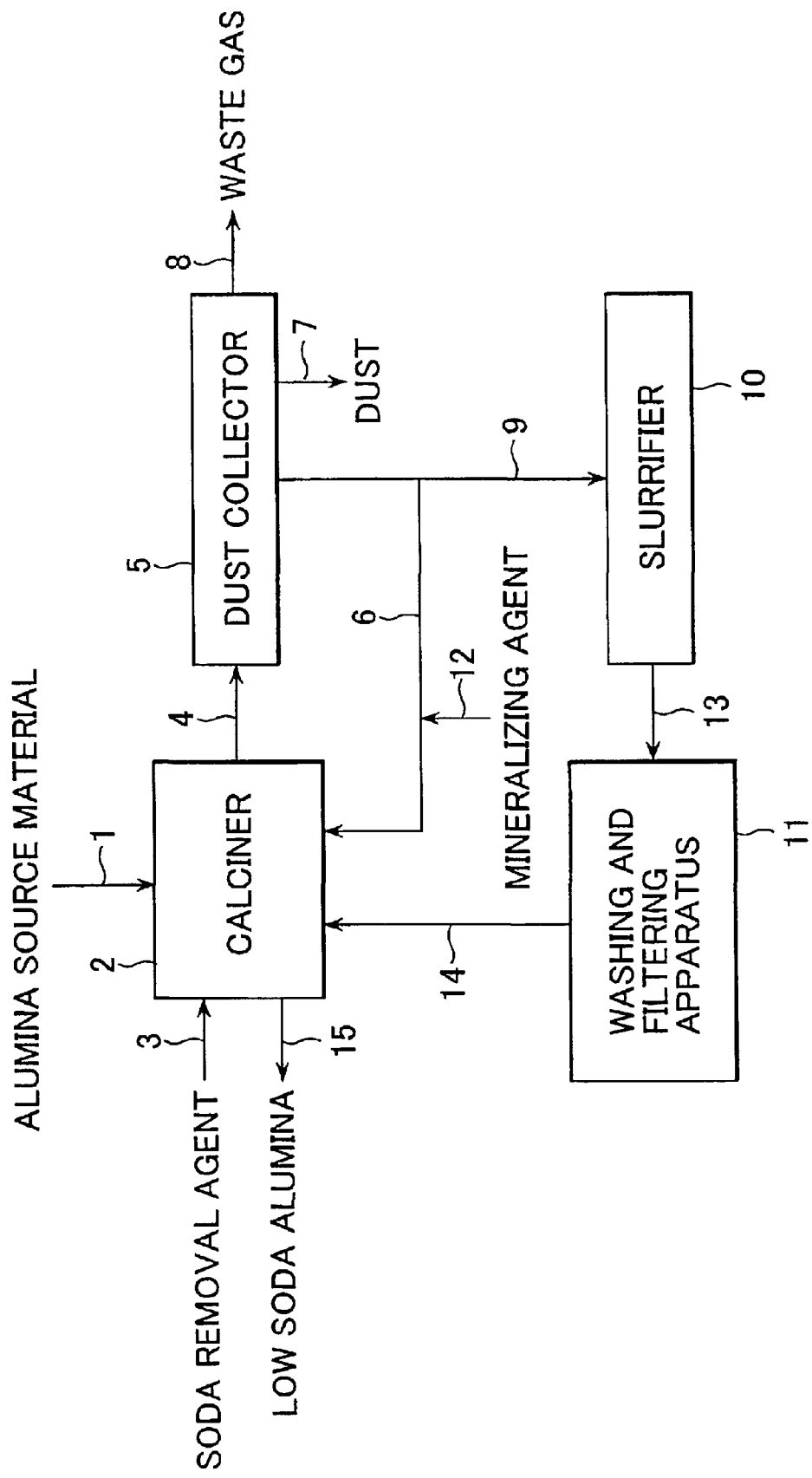

US 6,960,336 B2

METHOD OF PRODUCING LOW SODA ALUMINA, LOW SODA ALUMINA PRODUCED BY THE METHOD AND METHOD OF PRODUCING PORCELAIN

This application is an application filed under 35 U.S.C. §111(a) claiming the benefit pursuant to 35 U.S.C. §119(e)(i) of the filing date of Provisional Application No. 60/301,240 filed Jun. 28, 2001 pursuant to 35 U.S.C. §111(b).

TECHNICAL FIELD

The present invention relates to a method of producing low soda alumina, and to low soda alumina produced by the method. More particularly, the invention relates to a method of producing soda alumina having a low soda content that readily enables continuous production of low soda alumina, to low soda alumina produced by the method and to a method of producing porcelain using the low soda alumina.

BACKGROUND ART

Because of its excellent physical properties, such as chemical stability and mechanical strength, alumina is used in various mechanical and electrical parts. Most of the alumina that is thus used by industry is produced by calcining aluminum hydroxide obtained by the Bayer process. However, aluminum hydroxide obtained by the Bayer process normally unavoidably contains a soda content of 0.15 to 0.80 percent by weight, as $Na_2O$, on an alumina conversion basis. When the alumina is to be used as a raw material for electrical insulation ceramics materials for integrated circuit (IC) substrates or spark plugs and the like, the inclusion of that much soda is undesirable, since it can cause insulation defects and the like.

Various methods have therefore been proposed for removing the soda contained in the alumina. JP-A SHO 63-35573, for example, discloses a method of using aluminum hydroxide and alumina particles as raw materials to which are added a fluoride-based mineralizer and particles containing silicon oxide; JP-A HEI 10-167725 and HEI 11-49515 disclose adding alumina powder and fluoride to aluminum hydroxide and adding a silica-based compound as a soda removal agent; and JP-A HEI 7-41318 discloses a method comprising adding a fluoride-based mineralizer and α-alumina powder to aluminum hydroxide and adding a chloride-based compound as a soda removal agent. However, because in accordance with these methods a silica-based compound such as silica sand is added to remove the soda, the alumina that is obtained is contaminated by silica, degrading the sintering properties.

JP-A HEI 6-329412 discloses a two-stage method of calcinating aluminum hydroxide in the presence of a mineralizer. While with this method there is no risk that the alumina thus obtained is contaminated by silica, having to perform two calcining steps is not economical.

In recent years low soda alumina is used in the field of electronic ceramics materials such as IC substrates and IC packaging, and there is a strong need for a low-cost low soda alumina with good sintering properties that exhibits a stable shrinkage factor when sintered.

An object of the present invention is to provide a method of producing a low-cost low soda alumina that has good sintering properties, can be calcined even at a low temperature and has a stable shrinkage factor, and a low soda alumina produced by the method.

Another object of the invention is to provide a method of using the low soda alumina to produce porcelain in which the hue can be readily changed.

DISCLOSURE OF THE INVENTION

The present invention provides a method of producing low soda alumina, using an apparatus which comprises: means for supplying alumina source material to a calciner; means for supplying a soda removal agent to the calciner; means for gasifying the soda removal agent and supplying the gasified soda removal agent to the calciner while contacting the gasified soda removal agent to the alumina source material; means for supplying exhaust gas from the calciner to a dust-collector to collect dust contained in the exhaust gas; means for recirculating a portion of the collected dust back to the calciner; means for discharging a portion of the collected dust outside the apparatus; a slurrifier for slurrying a portion of the collected dust while controlling slurry pH; means for washing and filtering the slurried dust and recirculating the washed and filtered slurried dust back to the calciner; and means for extracting low soda alumina calcined by the calciner.

In accordance with another aspect of the invention, the method of producing low soda alumina comprises the steps of adding a soda removal agent to alumina source material and calcining the alumina source material in a calciner; collecting in a dust collector calcined alumina source material dust contained in exhaust gas; externally discharging a portion of the collected dust; slurrying another portion of the collected dust in a slurrifier while controlling slurry pH; washing and filtering the slurried dust and recirculating the washed and filtered slurried dust back to the calciner; recirculating still another portion of the collected dust, together with a mineralizer, back to the calciner; and extracting low soda alumina calcined by the calciner.

In the above method, the soda removal agent is added in an amount ratio that is 1 to 15 times a theoretical addition amount relative to a soda content of the alumina source material. The soda removal agent comprises at least one selected from a group consisting of hydrochloric acid, aluminum chloride, magnesium chloride and a chlorine-containing compound.

The above method also includes adding soda removal agent to effect a counter-current reaction with the alumina source material. The above method also includes slurrying the collected dust under a pH of 8 to 11, washing and filtering the dust slurry to remove soda content and mineralizing components from the dust and then recirculating the dust back to the calciner.

The above method also includes controlling a ratio between an amount (a) of collected dust that is slurried, washed and filtered and an amount (b) of dust that is collected and returned to the calciner without being slurried, washed and filtered. The above method also includes the amount (a) of collected dust that is slurried, washed and filtered being all or a portion of the collected dust. The above method also includes external discharge of a portion of the collected dust to lower the soda of the low soda alumina that is produced and to keep variation in the α-crystal diameter to within ±10%.

The above method also includes keeping the content of mineralizing components in the collected dust to 200 to 1,000 ppm (F equivalent) by effecting at least one selected from: adding a mineralizer, slurrying a portion of the dust and washing and filtering the slurry, and externally discharging a portion of the dust. The mineralizer comprises at least one selected from a group consisting of aluminum fluoride, hydrogen fluoride, ammonium fluoride, sodium fluoride, magnesium fluoride and calcium fluoride. The α-crystal diameter of the low soda alumina that is produced is within the range 0.4 to 10.0 μm. The low soda alumina of the present invention has an α-crystal diameter that is within the range 0.4 to 10.0 μm, and has a soda content of up to 0.1 weight percent, as $Na_2O$, on an alumina conversion basis.

The present invention also provides a method of producing porcelain comprising the steps of shaping alumina source material to which a flux has been added and sintering the shaped aluminum source material, wherein the hue b value of the porcelain is raised by raising the soda concentration of the alumina source material and the hue b value of the porcelain is decreased by decreasing the soda concentration of the alumina source material.

As described above, this invention provides low soda alumina which has good sintering properties and in which the α-crystals exhibit low diameter variation. This is achieved by using a chloride-based compound as a soda removal agent, discharging some of the dust in the exhaust gas from the calciner and adjusting the pH of some of the dust and using that dust to form a slurry that is recirculated back to the calciner. Also, the sintering temperature can be lowered by reducing the concentration of soda in the alumina.

Further features of the invention, its nature and various advantages will be more apparent from the accompanying drawing and following detailed description of the invention.

BRIEF DESCRIPTION OF THE DRAWINGS

FIG. 1 is an explanatory diagram of an example of an apparatus used by the invention for producing low soda alumina.

BEST MODE FOR WORKING THE INVENTION

The method of producing low soda alumina according to the present invention comprises the steps of adding a soda removal agent to alumina source material and calcining the alumina source material, collecting in a dust collector calcined alumina source material dust contained in exhaust gas, externally discharging a portion of the collected dust, slurrying another portion of the collected dust in a slurrifier while controlling the slurry pH, washing and filtering the slurried dust and recirculating the washed and filtered slurried dust back to the calciner, recirculating still another portion of the collected dust, together with a mineralizer, back to the calciner, and taking out low soda alumina calcined by the calciner.

FIG. 1 is a block diagram showing an example of a production apparatus that is preferably used to implement the above method of producing low soda alumina.

With reference to FIG. 1, alumina source material, such as aluminum hydroxide obtained by the Bayer process, for example, is supplied to a calciner 2 via line 1, and a soda removal agent is also supplied via line 3 to the calciner 2, and calcination is performed. Calcined alumina source material exhaust gas is conducted along line 4 to a dust collector 5, where dust in the exhaust gas is collected. A portion of the dust thus collected goes via line 9 to a slurrifier 10, where it is slurried while being maintained at a prescribed pH. It is then sent along line 13 to be washed and filtered by the washing and filtering apparatus 11, and is then returned to the calciner 2 via line 14. Via line 6, another portion of the dust collected by the dust collector 5 is returned to the calciner 2, with a mineralizer if required. Still another portion of the dust collected by the dust collector 5 is discharged via line 7 to reduce the soda content of the low soda alumina that is produced and to reduce variation in the diameter of the alumina α-crystals. Exhaust gas generated following the dust collection is discharged from the dust collector 5 via line 8. Dust and so forth recirculated to the calciner 2 via the lines 6 and 14 are again calcined with fresh alumina source material to produce low soda alumina. Low soda alumina thus obtained is discharged to the outside via line 15.

Each of the lines is provided with a means such as a valve to enable the line to be opened and closed as required. For example, the valves on the lines 6 and 9 can be used to adjust the ratio between the amounts of dust supplied to the calciner 2 and the slurrifier 10, and the valve on the line 7 can be used to adjust the total amount of dust in the system by discharging some of the dust out of the system. The appropriate amounts of soda removal agent, mineralizer and other such additives are set. Also, while in terms of the process it is preferable for a mineralizer to be included with the portion of the collected dust recirculated to the calciner, the mineralizer can instead be supplied directly to the calciner. In this invention, moreover, the adjustment means used to control the delivery flow rates of gases and the like is not limited to valves, but may be other means.

In accordance with the present invention, as described above, low soda alumina can be readily produced on a continuous basis.

As the alumina source material used for the purpose of this invention, it is preferable to use alumina source material obtained by the Bayer process. There is no particular limitation on the particle shape of the alumina source material. However, with reference to using aluminum hydroxide obtained by the Bayer process, in terms of cost it is advantageous to use gibbsite type aluminum hydroxide.

In this invention, low soda alumina means alumina containing not more than 0.1 weight percent of $Na_2O$ as the soda, and preferably not more than 0.05 weight percent. When the alumina source material used in the method of this invention contains more than 0.1 weight percent of $Na_2O$ in terms of the alumina content, for the calcining it is preferable to add a soda removal agent in an amount ratio that is 1 to 15 times the theoretical addition amount relative to the soda content of the alumina source material. There is no particular limitation on the soda removal agent, which may be any agent that when heated reacts with the soda to remove the soda. Examples of such an agent include hydrochloric acid, ammonium chloride, magnesium chloride and chlorine-containing compounds. These can be used singly or as an admixture of two or more. In the present invention, it is preferable to add the soda removal agent in a countercurrent to the alumina source material, with the soda removal agent gasified and contacted with the alumina source material to effect a reaction.

In the dust in the exhaust gas generated by the calciner, the $Na_2O$ content of the alumina is concentrated to 0.3 to 0.6 weight percent. By slurrying, washing and filtering the dust, it is possible to remove 50 to 80% of the soda content. In the step of washing and filtering the slurry, it is necessary to control the pH of the dust to 8 to 11. A pH value that is outside that range impedes the soda removal efficiency and is also bad for the equipment. With a pH value that is within the range of 8 to 11, slurrying, washing and filtering the dust also enables removal of concentrated fluorine and other such mineralizing components.

Dust collected by the dust collector 5 is divided into dust that is slurried, washed and filtered to form filter cakes, and dust that is recirculated to the calciner in its as-collected state. By controlling the ratio between the amount (a) of dust that is subjected to the washing and filtering process and the amount (b) of dust that recirculated to the calciner in the as-collected state, that is, by controlling whether dust amount (a) is all or part of the collected dust, even when the calcining temperature and other calcining conditions are the same, the α-crystal diameter can be modified and alumina powder obtained having a constant shrinkage factor. Increasing the amount of dust subjected to the washing and filtering process reduces the soda content and the mineralizing components.

By discharging out of the system a portion of the collected dust containing a concentrated level of soda and mineralizing components, such as via the line 7 in FIG. 1, even under the same calcining conditions, it is possible to obtain low soda alumina having a lower soda content and to keep α-crystal diameter variation to within ±10%, which helps to stabilize the calcining process. The degree to which the soda content and mineralizing components are concentrated differs depending on the size of the collected dust particles. In the case of fine dust particles, the concentration will be high, so the same effect will be obtained by discharging a small amount. Since this means that a concentrated soda content is discharged out of the system, it helps to lower the soda, while discharging the mineralizing components reduces the mineralizing effect on the calcining.

Dust that is collected and recirculated to the calciner is controlled to have a fluorine-based compound content of 200 to 1,000 ppm (F equivalent). This is done by controlling the ratio of the collected dust that is subjected to the slurrying, washing and filtering process, the amount of dust discharged outside the system from the dust collector, and the amount of fluorine-based compound or other such mineralizer that is added. If the amount of mineralizer added is too small, it will be difficult to obtain the requisite α-crystals, while adding too much will produce lamellar particles.

The fluorine-based compound used as a mineralizer can be comprised of at least one selected from aluminum fluoride, hydrogen fluoride, ammonium fluoride, sodium fluoride, magnesium fluoride and calcium fluoride. The α-crystal diameter of the low soda alumina that is produced should be within the range 0.4 to 10.0 μm. α-crystal diameters within this range can be obtained by selecting a suitable fluorine-based compound content, calcining temperature and calcining time.

There is no particular limitation on the dust collector that is used. Types that can be used include inertial collectors, electrostatic collectors, cyclones, bag filters and scrubbers.

In this invention, the temperature at which the alumina source material, such as aluminum hydroxide, is calcined can be selected according to the target calcination level. Generally, the material is calcined at around 1,000 to 1,500° C. for around 30 minutes to around 6 hours. Low soda alumina produced by the method of this invention can be advantageously used to form IC substrates, IC packages and other electronic parts, spark plugs, and various ceramics products.

The low soda alumina of the present invention can be used to produce porcelain by adding a flux thereto and using a known method to shape the resultant alumina and sintering the shaped alumina at a high temperature of around 1,600° C. Even when the same composition and sintering conditions are used, the hue b value of the porcelain that is produced can be adjusted within a range of 1 to 6 by using alumina materials with different soda contents. Alumina produced by adding an increased amount of soda removal agent to the calciner can be used to produce porcelain with a hue b value of 1 to 3, while using alumina produced by using a reduced amount of soda removal agent or by increasing the amount of dust discharged from the system, can be used to produce porcelain with a hue b value of 4 to 6. Thus, the hue b value of the porcelain that is produced can be raised by increasing the soda concentration of the alumina source material, and the hue b value can be lowered by reducing the soda concentration.

Examples according to the present invention are described below. However, the invention is not limited to these examples. The following measurement methods were used.
(1) Analysis of Composition
Fluorine (F): Measurement by fluorescent X-ray analysis.
$Na_2O$: Measurement by fluorescent X-ray analysis.
$SiO_2$: Measurement by fluorescent X-ray analysis.
(2) pH Measurement 30 g of powder was heated for 2 hours in 70 ml of hot pure water, and measured after cooling.
(3) Measurement of Particle Size Distribution Measured using a Microtrac HRA X-100 (manufactured by Nikkiso).
(4) Measurement of α-Crystal Diameter Measured using a Microtrac HRA X-100 (manufactured by Nikkiso).
(5) BET Measurement of Specific Surface Area Measured by the BET method, using nitrogen adsorption.
(6) Shrinkage: Calculated from Dimensions of Shaped Body/Dimensions of Sintered Body Crushing method: 550 g of 15-mm-diameter alumina balls, 550 g of 20-mm-diameter alumina balls, 550 g of alumina sample, 460 g of pure water and about 24 g of a flux ($SiO_2$, CaO, MgO or the like) were put into a 2-liter alumina pot which was rotated at 46 rpm for 40 hours to form a slurry.

Sintering method: The slurry was dried and loosened to a powder and sintered in a metal mold at 1,600° C. for 3 hours.
(7) Porcelain Hue: Measured using a Differential Calorimeter (C-2000 Differential Calorimeter Manufactured by Hitachi, Ltd.).

EXAMPLE 1

Aluminum hydroxide obtained by the Bayer process having a soda content of 0.20 weight percent, relative to the alumina, and containing approximately 10% water, was placed in a calciner. At the same time, 35% hydrochloric acid was introduced in a counter-current flow to the alumina in an amount that was about 7 times the theoretical amount of the soda content of the aluminum hydroxide, and this was followed by calcination. The calcined aluminum hydroxide dust was collected using a dust collector. Approximately 40% of the collected dust was slurried at a pH of 8.5, washed and filtered, returned to the calciner and again calcined at 1,100° C. to obtain α-alumina with a soda concentration of 0.05%. The alumina had an shrinkage of 1.220.

EXAMPLE 2

The same procedure used in Example 1 was used in Example 2, except that a different amount of the dust was slurried. Specifically, approximately 30% of the dust collected by the dust collector was slurried at a pH of 8.5, washed and filtered, returned to the calciner and again calcined to obtain low soda alumina. The alumina had a shrinkage of 1.220, and the α-crystal diameter was larger by 0.15 μm than that of the low soda alumina of Example 1.

EXAMPLE 3

The same procedure as Example 1 was used to obtain low soda alumina, except for the pH used in the slurrying, washing and filtering process. Table 1 shows the pH values used in Example 3. Table 1 also shows the percentage of the soda and fluorine components removed by the washing. Conditions were that 50 g of dust and 100 g of pure water were maintained at 60° C. for about 30 minutes, then filtered and dried at 110° C.

TABLE 1

| | Washing ratio (%) | |
|---|---|---|
| pH | Soda ($Na_2O$) | Fluorine (F) |
| 8 | 75 | 0 |
| 9 | 70 | 10 |
| 10 | 60 | 20 |
| 11 | 50 | 30 |

EXAMPLE 4

Aluminum hydroxide obtained by the Bayer process having a soda content of 0.20 weight percent, relative to the alumina, and containing approximately 10% water, was placed in a calciner. At the same time, 35% hydrochloric acid was introduced in a counter-current flow to the alumina in an amount that was about 7 times the theoretical amount of the soda content of the aluminum hydroxide, and this was followed by calcination, and the calcined aluminum hydroxide dust was collected using a dust collector. Approximately 40% of the collected dust was slurried at a pH of 8.5, washed and filtered, returned to the calciner, where it was again calcined at 1,100° C. to obtain low soda alumina. At the same time as the slurrying, approximately 10% of the dust collected by the dust collector was discharged out of the system. The low soda alumina thus obtained had a soda content of 0.02%, reduced time-based variation of the BET specific surface area, and an approximately 20% improvement in yield.

EXAMPLE 5

The same procedure as that of Example 4 was used to obtain low soda alumina, except that different amounts of fluorine compound were used. Table 2 shows the amounts of fluorine compound used in Example 5.

TABLE 2

| Fluorine concentration of dust (ppm) | α-crystal diameter ($\mu$m) | Soda ($Na_2O$) content (%) |
|---|---|---|
| 400 | 1.5 | 0.04 |
| 800 | 3.0 | 0.04 |

EXAMPLE 6

Two types of low soda alumina were produced using the method of Example 1, except for the method used to process the dust. The methods used in Example 6 are listed in Table 3. These aluminas were used to produce two types of porcelain. Porcelain sintering conditions were based on the crushing and sintering methods used.

TABLE 3

| Hue b value of porcelain | Washing ratio (%) | Amount of hydrochloric acid added (relative to theoretical amount) | Remarks |
|---|---|---|---|
| 1.5 | 40 | Approx. 7 times | Fluorine-based compound content of dust controlled to 700 ppm. Sintering of Example 1 used. |
| 5.0 | 40 | Approx. 4 times | Approx. 15% of collected dust expelled from system. Fluorine compound content of dust controlled to 700 ppm. Sintering based on Example 1. |

As can be seen from Table 3, depending on the method used to process the collected dust, the α-alumina obtained resulted in a different porcelain hue. In each case, the low soda alumina had a $Na_2O$ content of 0.04 to 0.05%.

COMPARATIVE EXAMPLE 1

Alumina was produced using the procedure of Example 1, except that the dust was returned to the calciner without being subjected to sintering, washing and filtering. The alumina thus obtained had a $Na_2O$ content of 0.15%, meaning that low soda alumina could not be obtained.

INDUSTRIAL APPLICABILITY

In accordance with the present invention, low-cost low soda alumina can be continuously produced that is not contaminated by silica, has excellent sintering properties and a stable shrinkage factor. Low soda alumina produced by the method of this invention can be used to form IC substrates, IC packages, spark plugs, and various ceramics products, so the invention has high commercial value.

What is claimed is:

1. A method of producing low soda alumina, comprising:
   (a) supplying alumina source material to a calciner and calcining the alumina source material in the calciner;
   (b) supplying a soda removal agent to the calciner;
   (c) gasifying the soda removal agent and supplying the gasified soda removal agent to the calciner while contacting the gasified soda removal agent to the alumina source material;
   (d) supplying exhaust gas from the calciner to a dust-collector to collect dust contained in the exhaust gas;
   (e) recirculating a portion of the collected dust back to the calciner;
   (f) externally discharging another portion of the collected dust;
   (g) slurrying still another portion of the collected dust while controlling slurry pH;
   (h) washing and filtering the slurried dust and recirculating the washed and filtered slurried dust back to the calciner; and
   (i) extracting low soda alumina calcined by the calciner.

2. A method of producing low soda alumina comprising the steps of:

adding a soda removal agent to alumina source material and calcining the alumina source material in a calciner;

collecting in a dust collector calcined alumina source material dust contained in exhaust gas;

externally discharging a portion of the collected dust;

slurrying another portion of the collected dust in a slurrifier while controlling slurry pH;

washing and filtering the slurried dust and recirculating the washed and filtered slurried dust back to the calciner;

recirculating still another portion of the collected dust together with a mineralizer to the calciner; and extracting low soda alumina calcined by the calciner.

3. The method according to claim 1 or 2, wherein the soda removal agent is added in an amount ratio that is 1 to 15 times a theoretical addition amount relative to a soda content of the alumina source material.

4. The method according to claim 1 or 2, wherein the soda removal agent comprises at least one compound selected from the group consisting of hydrochloric acid, ammonium chloride, magnesium chloride and chlorine-containing compounds.

5. The method according to claim 1 or 2, wherein the soda removal agent is added to effect a counter-current reaction with the alumina source material.

6. The method according to claim 1 or 2, wherein the collected dust is slurried under a pH of 8 to 11, and washed and filtered to remove a soda content and mineralizing components from the dust.

7. The method according to claim 1 or 2, wherein a ratio between an amount (a) of the collected dust that is slurried, washed and filtered and an amount (b) of the dust that is collected and returned to the calciner without being slurried, washed and filtered is controlled.

8. The method according to claim 7, wherein the amount (a) of the collected dust that is slurried, washed and filtered is all or a portion of the collected dust of amounts (a) and (b).

9. The method according to claim 1 or 2, wherein a content of mineralizing components in the collected dust that is recirculated to the calciner is controlled to have a fluorine based compound content of 200 to 1,000 ppm, based on F.

10. The method according to claim 9, wherein the mineralizer comprises at least one compound selected from the group consisting of aluminum fluoride, hydrogen fluoride, ammonium fluoride, sodium fluoride, magnesium fluoride and calcium fluoride.

11. The method according to claim 1 or 2, wherein the low soda alumina that is produced has an α-crystal diameter in a range of 0.4 to 10.0 μm.

* * * * *